No. 689,729. Patented Dec. 24, 1901.
A. S. KROTZ.
DEVICE FOR EQUIPPING VEHICLE WHEELS WITH RUBBER TIRES.
(Application filed July 19, 1900.)
(No Model.) 2 Sheets—Sheet 1.
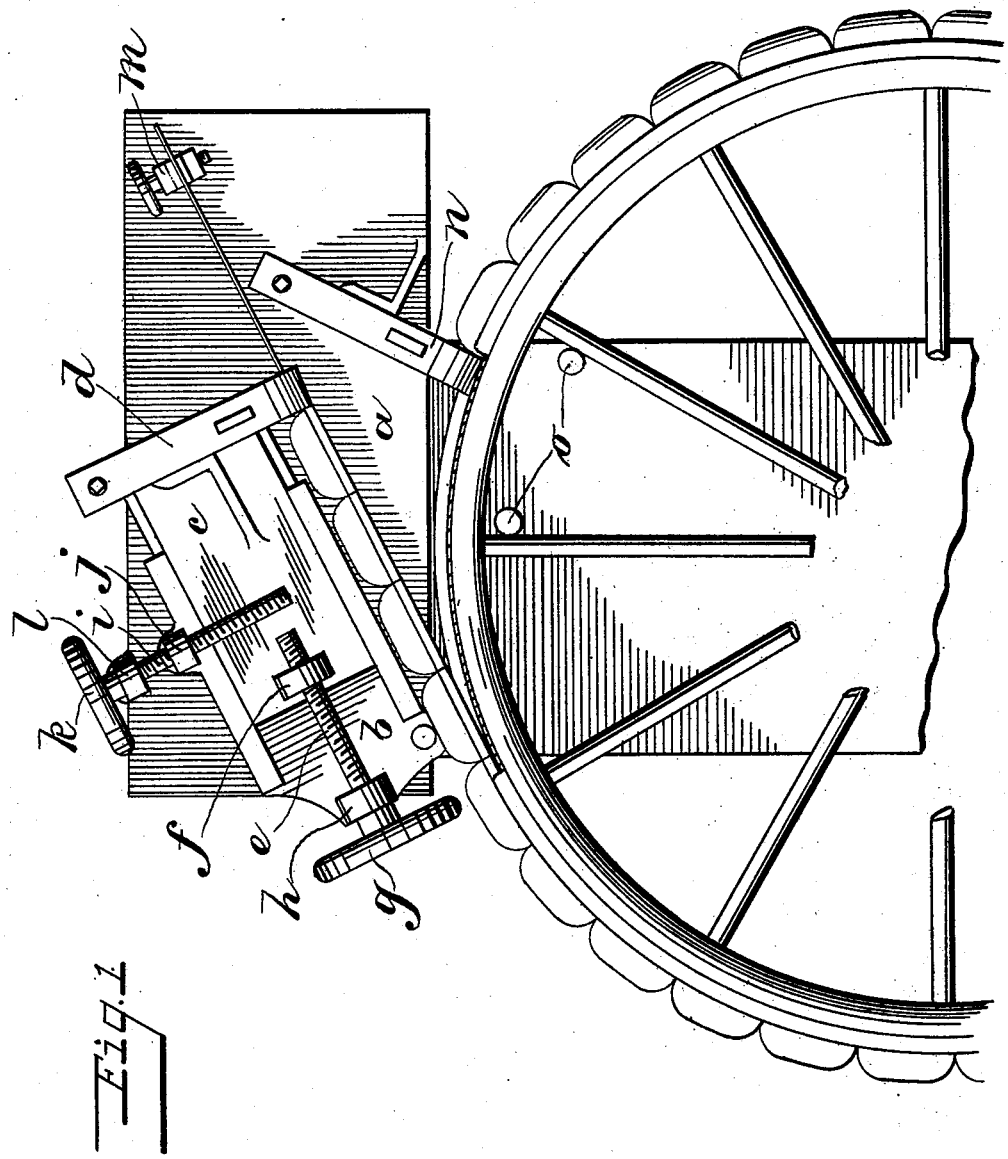
WITNESSES:
Frank L. Walker
Edmond J. Ogden
INVENTOR.
BY Alvaro S. Krotz
ATTORNEY.

No. 689,729. Patented Dec. 24, 1901.
A. S. KROTZ.
DEVICE FOR EQUIPPING VEHICLE WHEELS WITH RUBBER TIRES.
(Application filed July 19, 1900.)
(No Model.) 2 Sheets—Sheet 2.
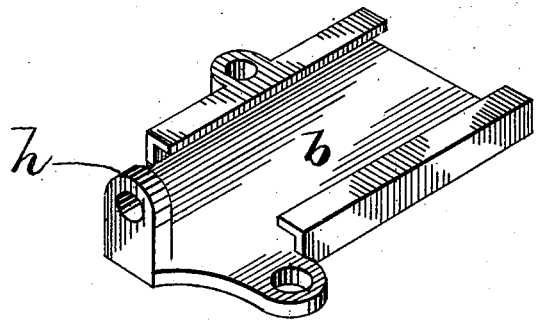
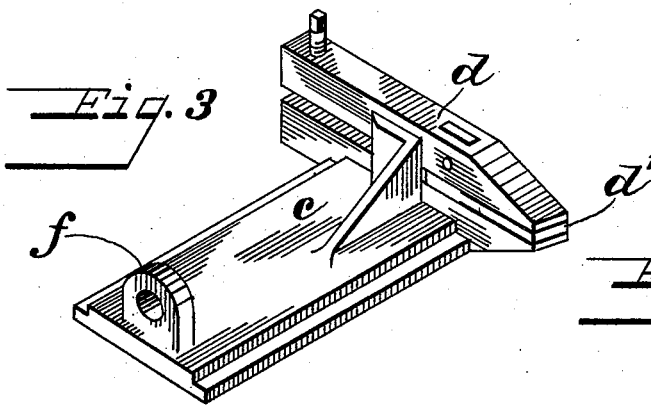
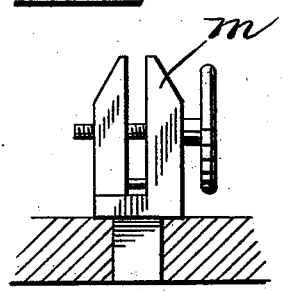
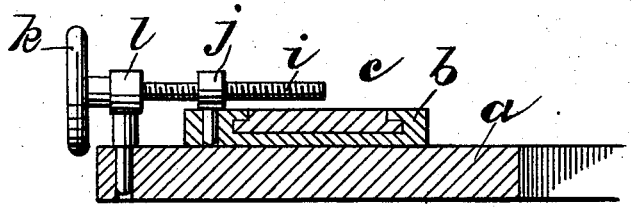
WITNESSES:
Frank L. Walker
Edmond J. Ogden
INVENTOR
Alvaro S. Krotz
BY
ATTORNEY
THE NORRIS PETERS CO., PHOTO-LITHO., WASHINGTON, D. C.

UNITED STATES PATENT OFFICE.

ALVARO S. KROTZ, OF SPRINGFIELD, OHIO, ASSIGNOR TO CONSOLIDATED RUBBER TIRE COMPANY, OF JERSEY CITY, NEW JERSEY, A CORPORATION OF NEW JERSEY.

DEVICE FOR EQUIPPING VEHICLE-WHEELS WITH RUBBER TIRES.

SPECIFICATION forming part of Letters Patent No. 689,729, dated December 24, 1901.

Application filed July 19, 1900. Serial No. 24,344. (No model.)

*To all whom it may concern:*

Be it known that I, ALVARO S. KROTZ, a citizen of the United States, residing at Springfield, in the county of Clark and State of Ohio, have invented certain new and useful Improvements in Devices for Equipping Vehicle-Wheels with Rubber Tires, of which the following is a specification.

My invention relates to improvements in devices for equipping vehicle-wheels with rubber tires, and more particularly to that class of devices for equipping vehicle-wheels having channeled rims to receive the tires and independent retaining band or bands.

The object of my invention is to provide an effective device that will tighten the bands and hold them in place while they are being united and to compress the tire, so that after the bands are united the ends of the tire can be more readily brought together, all of which is accomplished without springing the tire over the rim of the channel.

In the accompanying drawings, Figure 1 is a plan view of my device. Fig. 2 is a detail of the pivoted frame. Fig. 3 is the sliding head with jaws. Fig. 4 is a sectional view of the bed, frame, and head with swiveled screw. Fig. 5 is a detail of the swiveled sleeve. Fig. 6 shows the stationary band-holding jaws.

Like parts are represented by similar letters of reference in the several views.

My device consists, essentially, of a bed *a*, on which is pivoted a frame *b*, having grooves therein to carry a sliding head *c*, said head carrying on its outer end a pair of band-holding jaws *d*, preferably formed with a central plate or tongue *d'* to clamp both bands when two bands are used. The sliding head *c* is operated by means of a screw-threaded shaft *e*, working in a screw-threaded lug *f* on said head *c*, the other end of said shaft being provided with a hand-wheel *g* and adjacent thereto being journaled in a plain lug *h*, formed on said frame *b*. There is also a screw-threaded shaft *i*, working in a screw-threaded swiveled sleeve *j* on the frame *b*, the other end of said shaft being provided with a hand-wheel *k* and journaled adjacent thereto in a plain sleeve *l*, swivelly mounted on said bed *a*. There is also a pair of stationary jaws *m* attached to said bed *a* in a line tangent with the periphery of said wheel passing through said jaws *d* to hold the bands while the jaws *d* are being run back to take a fresh hold of the bands, and there is also a pair of stationary jaws *n* attached to said bed *a* to hold one end of the bands while the bands are being tightened from the other ends and during the process of uniting the ends of the bands. These jaws are also preferably provided with the intermediate tongue *d'*, the same as in jaws *d*. Both pairs of jaws *d* and *n* are preferably reduced at their holding extremities to project into the tire-holding channel while the ends of the bands are being united. To hold the wheel from turning in place against the strain of tightening the bands or compressing the tire, the pins or stops *o* are provided. When the head *c*, carrying the band-holding jaws *d*, is run out to the full limit of the shaft *e*, the end of the tire rests against the jaws *d*, so that when the head *c* is drawn in to the limit of the shaft *e* it compresses the tire on the bands. The frame is so pivoted in relation to the wheel that when the head, with its jaws, is extended to its full limit the distance from the point in the wheel-channel where the tire leaves the channel to said jaws is greater than the distence from said point to the other end of the tire, whereby a tire can be provided of proper length for the wheel and be compressed by the movable jaws. After the bands have been united this compression materially assists in drawing the ends of the tire together. A notched or sectional tire is shown; but it is obvious a solid tire can be used.

The operation of my device is as follows: The head *c* is run out preferably to the full limit of the shaft *e* and the tire placed on the band or bands and fitted in the channel, with one end of the band or bands clamped by the jaws *n*, the other end of the band or bands passing around the wheel through the jaws *d* and clamped by the jaws *m*, with the end of the tire resting against the jaws *d*. The shaft *e* is then operated to draw back the head and jaws, and thus compress the tire on the bands. The jaws *d* are then clamped to the bands and the clamp *m* released. The shaft *e* is then operated in the opposite direction until the tire is properly tightened in the channel. The bands are then cut to the proper length, and by the operation of the shaft $i$ the head $c$ is moved to carry the jaws $d$, with bands and tire, into the channel adjacent to the stationary jaws $n$, where the ends of the bands may be united in any well-known manner and the jaws released, the proper relative positions for the ends of the bands in joining being secured by adjustment by the screws $e$ and $i$. The ends of the tire are then brought together, the compression given the tire by the movement of the head and jaws $d$ materially assisting in the operation.

It is preferable that the compression of the tire be confined to the end thereof, and for this purpose it should be stated that the bands be tightened by the alternate operation of the jaws $d$ and $m$ until the tire is fairly tightened in the channel before the tire is compressed by forcing it back on the bands behind the jaws $d$.

Having thus described my invention, I claim—

1. In a rubber-tire machine, the combination with the bed and independent band-holding devices, of a swinging frame pivoted at one end and carrying band-holding jaws at the other, and means for moving said frame to adjust the position of said jaws radially from the wheel-channel, substantially as specified.

2. In a rubber-tire machine, the combination with the bed and independent band-holding devices, of a swinging frame pivoted at one end and carrying a sliding head and band-holding jaws at the other so as to adjust the distance radially of said jaws from the wheel-channel, means for moving said head and jaws in said frame in any position of adjustment of said frame, said jaws being adapted to clamp the wire and to be moved into one position for compressing the tire and tightening the bands and into another for uniting the bands, substantially as specified.

3. In a rubber-tire machine, the combination with two stationary band-holding devices, of a swinging frame carrying a sliding head and band-holding jaws, said frame being so pivoted and adapted with said head, as to move the jaws carried by it, into line with each of said stationary band-holding devices, without said line intersecting the other device when in line with one of them, for the purpose, while in one position, of compressing the tire and tightening the bands, and in the other position of uniting the bands, substantially as specified.

4. In a rubber-tire machine, the combination with two stationary band-holding devices, of a swinging frame carrying a sliding head and band-holding jaws, said frame being so pivoted and adapted with said head, as to move said jaws successively in line with each of said stationary band-holding devices without said line intersecting the other device when in line with one of them, and means for moving said head and jaws in said frame, when in one position, to compress the tire and tighten the bands, substantially as specified.

5. In a rubber-tire machine, the combination with the bed, of a movable frame carrying band-holding jaws so placed in relation to the wheel that when in one position the distance from the point where the tire leaves the wheel-channel to said jaws is greater than the distance from said point to the other end of the tire, and means on said frame to move said jaws to compress the tire, substantially as specified.

6. In a rubber-tire machine, the combination with a stationary band-holding device having its jaws in a line tangent from the wheel-channel and a stationary band-holding device with its clamping-arms wholly between said line and wheel-channel, and having its jaws extending into said channel, of a movable band-holding device, which, when in one position, has its jaws in said tangent-line, and means for moving said movable clamp so that its jaws will extend into said channel, substantially as and for the purpose specified.

7. In a rubber-tire machine, the combination with a stationary band-holding device having its jaws in a line tangent from the wheel-channel and a stationary band-holding device between said line and wheel-channel, having its jaws extending into said channel, of a swinging frame carrying a sliding head and band-holding jaws, said frame being so pivoted and adapted with said head as to move the jaws carried by it successively in line with the jaws of each of said stationary band-holding devices, and means to move said head and jaws in said frame to compress the tire and tighten the bands, substantially as specified.

8. In a rubber-tire machine, the combination with the main support, of a swinging frame carrying a sliding head and jaws, means for positively moving said frame to different positions of adjustment, and means on said frame for positively moving said head and jaws independent of the movement of said swinging frame, and independent stationary band-holding devices adapted to hold the respective ends of the bands when not engaged by the movable jaws on said swinging frame, whereby the movable jaws may be moved to one position for compressing the tire and tightening the bands and in another position for uniting the ends of the bands, said frame with its movable jaws being so placed with reference to said stationary band-holding devices that when said jaws are in line with one of said devices for the purpose of compressing the tire and tightening the bands, the bands will not intersect the other device, substantially as and for the purpose specified.

In testimony whereof I have hereunto set my hand this 14th day of July, A. D. 1900.

ALVARO S. KROTZ.

Witnesses:
CHAS. I. WELCH,
EDMOND J. OGDEN.